(12) United States Patent
Doumbouya et al.

(10) Patent No.: US 11,625,835 B2
(45) Date of Patent: Apr. 11, 2023

(54) ALIAS CAPTURE TO SUPPORT SEARCHING FOR AN OBJECT-OF-INTEREST

(71) Applicant: AVIGILON CORPORATION, Vancouver (CA)

(72) Inventors: Moussa Doumbouya, Santa Clara, CA (US); Yanyan Hu, Medford, MA (US); Kevin Piette, Carlisle, MA (US); Pietro Russo, Melrose, MA (US); Peter L. Venetianer, McLean, VA (US); Bo Yang Yu, Winchester, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 112 days.

(21) Appl. No.: 17/323,092

(22) Filed: May 18, 2021

(65) Prior Publication Data

US 2021/0271869 A1 Sep. 2, 2021

Related U.S. Application Data

(63) Continuation of application No. 16/593,789, filed on Oct. 4, 2019, now Pat. No. 11,048,930.

(Continued)

(51) Int. Cl.
  *G06T 7/215* (2017.01)
  *G06V 40/10* (2022.01)
  (Continued)

(52) U.S. Cl.
  CPC .............. *G06T 7/215* (2017.01); *G06V 10/75* (2022.01); *G06V 20/52* (2022.01); *G06V 40/10* (2022.01);
  (Continued)

(58) Field of Classification Search
  None
  See application file for complete search history.

(56) References Cited

U.S. PATENT DOCUMENTS

| 10,007,862 | B2 | 6/2018 | Gurwicz et al. |
| 10,121,515 | B2 | 11/2018 | Doumbouya et al. |

(Continued)

FOREIGN PATENT DOCUMENTS

| CN | 107180378 A | 9/2017 |
| EP | 3312763 B1 | 4/2018 |
| GB | 2542884 A | 4/2017 |

OTHER PUBLICATIONS

Traylor et al., "Learning String Alignments for Entity Aliases", 31st Conference on Neural Information Processing Systems, 2017, pp. 1-8, Long Beach, CA, USA.

(Continued)

*Primary Examiner* — Leon Flores

(57) ABSTRACT

Alias capture to support searching for an object-of-interest is disclosed. A method includes capturing, using a camera with a defined field of view, video image frames that include a moving object-of-interest. The method also includes tracking the object-of-interest over a period of time starting when the object-of-interest enters the field of view and ending when the object-of-interest exits the field of view. The method also includes detecting, at a point in time in-between the start and end of the period of time of the tracking, a threshold exceeding change in an appearance of the object-of-interest. The method also includes creating, before the end of the period of time of the tracking, a new object profile for the object-of-interest in response to the detecting of the threshold exceeding change.

19 Claims, 11 Drawing Sheets

Related U.S. Application Data

(60) Provisional application No. 62/758,065, filed on Nov. 9, 2018.

(51) Int. Cl.
*G06V 40/20* (2022.01)
*G06V 10/75* (2022.01)
*G06V 20/52* (2022.01)
*G06V 40/16* (2022.01)

(52) U.S. Cl.
CPC .......... *G06V 40/103* (2022.01); *G06V 40/161* (2022.01); *G06V 40/20* (2022.01); *G06T 2207/10016* (2013.01)

(56) References Cited

U.S. PATENT DOCUMENTS

| | | | |
|---|---|---|---|
| 11,048,930 B2 * | 6/2021 | Doumbouya | G06V 40/20 |
| 2014/0294231 A1 | 10/2014 | Datta et al. | |
| 2015/0201198 A1 | 7/2015 | Marlatt et al. | |
| 2017/0169297 A1 | 6/2017 | Bernal et al. | |
| 2019/0080003 A1 | 3/2019 | Alcantara et al. | |
| 2019/0130165 A1 | 5/2019 | Seshadri et al. | |
| 2019/0130202 A1 | 5/2019 | Doumbouya et al. | |
| 2019/0130586 A1 | 5/2019 | Zhou et al. | |
| 2019/0294631 A1 | 9/2019 | Alcantara et al. | |

OTHER PUBLICATIONS

Wang, Alex Sheng-Yuan, "Mela Level Tracking with Stochastic Grammar", UBC PhD Thesis Paper, Aug. 2009, 185 pages.

Dehghan et al., "Understanding Crowd Collectivity: A Mela-Tracking Approach", IEEE International Conference on ComputerVision and Pattern Recognition Workshop, 2015.

Schumann, Arne, and Eduardo Monari. "A soft-biometrics dataset for person tracking and re-identification." 2014 11th IEEE International Conference on Advanced Video and Signal Based Surveillance (AVSS). IEEE, 2014 See whole document.

Patents Act 1977: Combined Search and Examination Report Under Sections 17 and 18(3), corresponding Patent Application No. GB2214334.1, date of search: Oct. 31, 2022.

* cited by examiner

ALIAS CAPTURE TO SUPPORT SEARCHING FOR AN OBJECT-OF-INTEREST

RELATED U.S. APPLICATION DATA

This Patent Applications is a Continuation of U.S. patent application Ser. No. 16/593,789 filed Oct. 4, 2019, entitled "ALIAS CAPTURE TO SUPPORT SEARCHING FOR AN OBJECT-OF-INTEREST", which is related to and claims the benefit of earlier filed U.S. Provisional Patent Application Ser. No. 62/758,065, filed on Nov. 9, 2018, entitled "ALIAS CAPTURE TO SUPPORT SEARCHING FOR AN OBJECT-OF-INTEREST"; and the contents and teachings of all the above applications are hereby incorporated by reference in their entireties.

BACKGROUND

Intelligent processing and playback of recorded surveillance video is often an important function for inclusion in a physical surveillance system. For example, a physical surveillance system may include many cameras, each of which records surveillance video. The total amount of surveillance video recorded by those cameras, much of which is typically recorded concurrently, makes relying upon manual location and tracking of a person-of-interest who appears in the recorded surveillance video inefficient. Intelligent processing and playback of surveillance video, and in particular automated search functionality, may accordingly be used to increase the efficiency with which a person-of-interest can be identified using a physical surveillance system.

Near real-time (live) tracking of a person-of-interest introduces additional challenges. Often a moving object can, at a first moment in time, be within the Field Of View (FOV) of a first camera, then at a later second moment in time be outside the FOV of any cameras, and then at a still later third moment in time be within the FOV of a second camera. Known methods for identifying that the moving object in the FOV of the first camera at the first moment in time is the same the moving object in the FOV of the second camera at the third moment in time suffer from limitations such as, for example, delay in making the match, inability to scale over a large number of cameras, need for manual input in the matching process, etc.

SUMMARY

According to one example embodiment, there is provided camera that includes an image sensor configured to capture video image frames that correspond to a defined field of view of the camera, including a moving object-of-interest. The camera also includes a processor configured to execute instructions to carry out a computer-implemented method that includes tracking the object-of-interest over a period of time starting when the object-of-interest enters the field of view and ending when the object-of-interest exits the field of view, and the computer-implemented method also including detecting, at a point in time in-between the start and end of the period of time of the tracking, a threshold exceeding change in an appearance of the object-of-interest, and computer-implemented method also including creating, before the end of the period of time of the tracking, a new object profile for the object-of-interest in response to the detecting of the threshold exceeding change.

According to another example embodiment, there is provided a surveillance network that includes a camera configured to capture video image frames that correspond to a defined field of view of the camera, including a moving object-of-interest. The camera is also configured to track the object-of-interest over a period of time starting when the object-of-interest enters the field of view and ending when the object-of-interest exits the field of view. The camera is also configured to detect, at a point in time in-between the start and end of the period of time of the tracking, a threshold exceeding change in an appearance of the object-of-interest. The camera is also configured to create, before the end of the period of time of the tracking, a new object profile for the object-of-interest in response to the detecting of the threshold exceeding change. The camera is also configured to transmit, in response to at least the creating of the new object profile, object profile data related to the object-of-interest. The surveillance network also includes a server that includes a database within a server storage, and the server being configured to store the object profile data, received from the camera, as a new entry within the database.

According to another example embodiment, there is provided a method that includes capturing, using a camera with a defined field of view, video image frames that include a moving object-of-interest. The method also includes tracking the object-of-interest over a period of time starting when the object-of-interest enters the field of view and ending when the object-of-interest exits the field of view. The method also includes detecting, at a point in time in-between the start and end of the period of time of the tracking, a threshold exceeding change in an appearance of the object-of-interest. The method also includes creating, before the end of the period of time of the tracking, a new object profile for the object-of-interest in response to the detecting of the threshold exceeding change.

According to yet another example embodiment, there is provided a method that includes capturing, using a camera with a defined field of view, video image frames that include a moving object-of-interest. The method also includes tracking the object-of-interest over a period of time starting at a first instance in time when the object-of-interest enters the field of view and ending at a second instance in time when the object-of-interest exits the field of view. The method also includes starting, at the first instance in time, a timer having a timer period, and when the second instance in time occurs early in time than an end of the timer period, creating a new object profile contemporaneous with the object-of-interest exiting the field of view, and when the second instance in time occurs later in time than the end of the timer period, creating the new object profile contemporaneous with the end of the timer period, and then optionally the timer immediately resets back to the start of the timer period.

According to another aspect, there is provided a non-transitory computer readable medium having stored thereon computer program code that is executable by a processor and that, when executed by the processor, causes the processor to perform method(s) in accordance with example embodiments.

BRIEF DESCRIPTION OF THE DRAWINGS

Reference will now be made, by way of example, to the accompanying drawings.

Similar or the same reference numerals may have been used in different figures to denote similar example features illustrated in the drawings.

DETAILED DESCRIPTION OF EXAMPLE EMBODIMENTS

Figure 1:
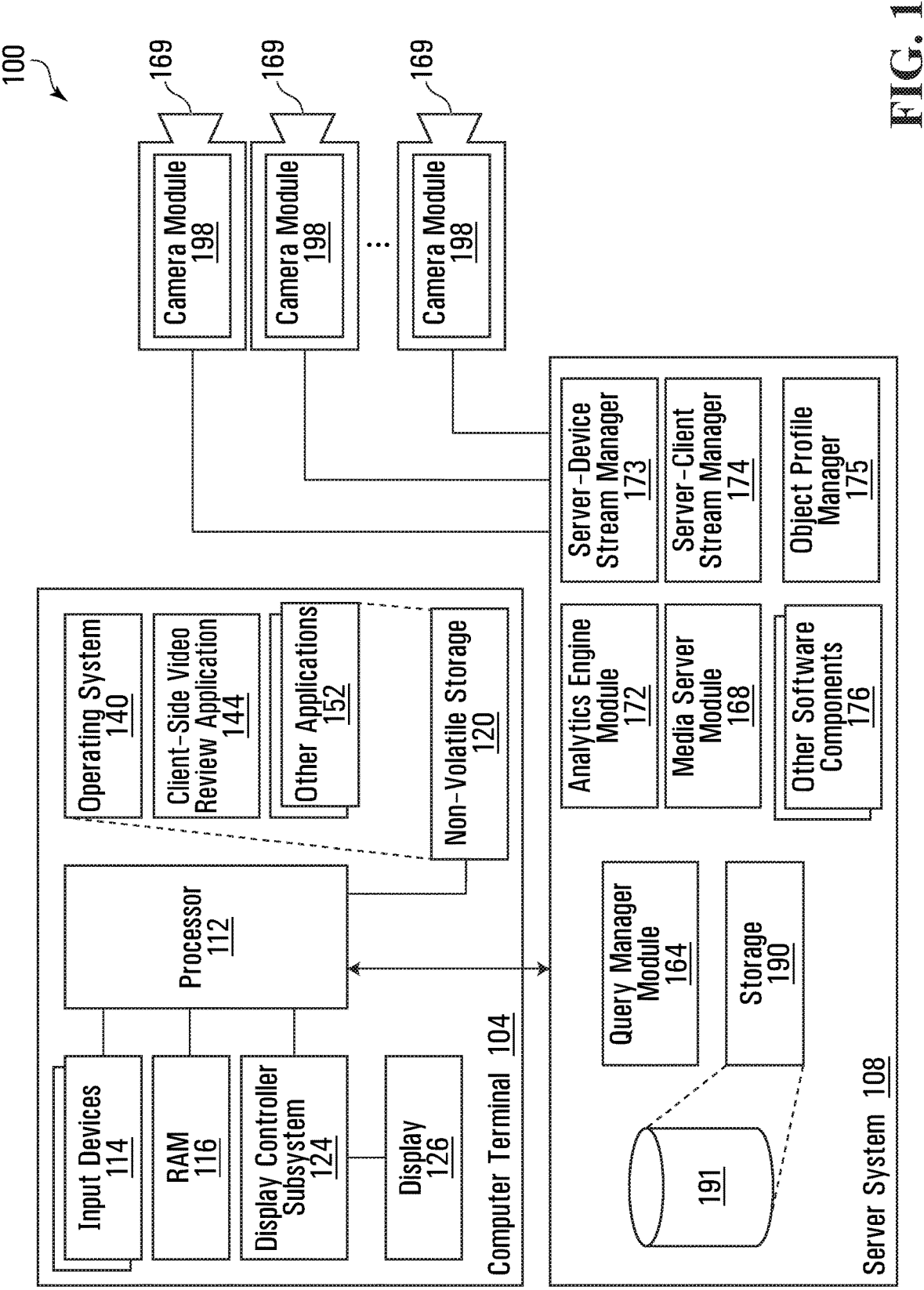
FIG. 1 shows a block diagram of an example surveillance system within which methods in accordance with example embodiments can be carried out.

It will be understood that when an element is herein referred to as being "connected", "in communication with" or "coupled" to another element, it can be directly connected, directly in communication with or directly coupled to the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

As will be appreciated by one skilled in the art, the various example embodiments described herein may be embodied as a method, system, or computer program product. Accordingly, the various example embodiments may take the form of, for example, an entirely software embodiment (including firmware, resident software, micro-code, etc.) or, as another example, an embodiment combining software and hardware aspects that may all generally be referred to herein as a "module" or "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The actual programming language selected is a matter of design choice and, as will be appreciated by those skilled in the art, any suitable programming language can be utilized.

Various example embodiments are described below with reference to flowchart illustration(s) and/or block diagrams of methods, apparatus (systems) and computer program products according to various embodiments. Those skilled in the art will understand that various blocks of the flowchart illustration(s) and/or block diagrams, and combinations of blocks in the flowchart illustration(s) and/or block diagrams, can be implemented by computer program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

This disclosure describes various example embodiments. It is contemplated that, to the extent that a person skilled in the art would understand it to be feasible, any part of any example embodiment described herein may be implemented or combined with any part of any other example embodiment described herein.

The term "object" as used herein is understood to have the same meaning as would normally be given by one skilled in the art of video analytics, and examples of objects may include humans (for example, full bodies or alternatively something partial like faces), vehicles, animals, etc.

The noun "track(s)" is used herein in a number of instances. As will be appreciated by those skilled in the art of video analytics, "tracks" are created in tracking, where each track encompasses one grouping of all detections pertaining to a same tracked object and each track is uniquely identifiable. The term track as used herein is not to be limited in meaning such that the full trajectory of the object is necessarily required (unless this meaning would be called for within the particular context in which the term is used).

Reference is now made to FIG. 1 which shows a block diagram of an example surveillance system 100 within which methods in accordance with example embodiments can be carried out. Included within the illustrated surveillance system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems [not shown]. The display controller subsystem 124 interacts with display 126 and it renders graphics and/or text upon the display 126.

Still with reference to the computer terminal 104 of the surveillance system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into a volatile store such as the RAM 116. The processor 112, in addition to its operating system functions, can enable execution of the various software applications on the computer terminal 104.

Figure 2:
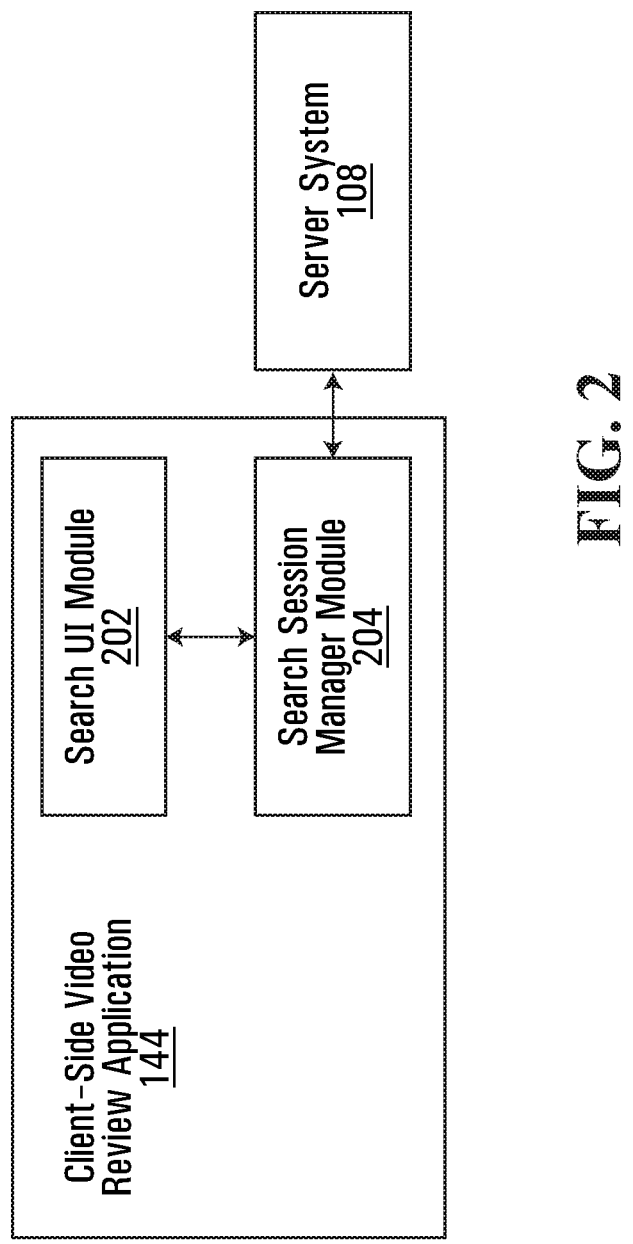
FIG. 2 shows a block diagram of a client-side video review application, in accordance with certain example embodiments, that can be provided within the example surveillance system of FIG. 1.

More details of the video review application 144 are shown in the block diagram of FIG. 2. The video review application 144 can be run on the computer terminal 104 and includes a search User Interface (UI) module 202 for cooperation with a search session manager module 204 in order to enable a computer terminal user to carry out actions related to providing input and, more specifically, input to facilitate identifying same individuals or objects appearing in a plurality of different video recordings. In such circumstances, the user of the computer terminal 104 is provided with a user interface generated on the display 126 through which the user inputs and receives information in relation the video recordings.

The video review application 144 also includes the search session manager module 204 mentioned above. The search session manager module 204 provides a communications interface between the search UI module 202 and a query manager module 164 (FIG. 1) of the server system 108. In at least some examples, the search session manager module 204 communicates with the query manager module 164 through the use of Remote Procedure Calls (RPCs). The query manager module 164 receives and processes queries originating from the computer terminal 104, which may facilitate retrieval and delivery of specifically defined video data and metadata in support of client-side video review, export, redaction, etc.

Referring once again to FIG. 1, the server system 108 includes several software components (besides the query manager module 164 already described) for carrying out other functions of the server system 108. For example, the server system 108 includes a media server module 168 (FIG. 1). The media server module 168 handles client requests related to storage and retrieval of surveillance video taken by video cameras 169 in the surveillance system 100. The server system 108 also includes an analytics engine module 172. The analytics engine module 172 can, in some examples, be any suitable one of known commercially available software that carry out mathematical calculations (and other operations) to attempt computerized matching of same individuals or objects as between different portions of surveillance video recordings (or as between any reference image and live or recorded surveillance video compared to the reference image). For example, the analytics engine module 172 can, in one specific example, be a software component of the Avigilon Control Center™ server software sold by Avigilon Corporation. In another example, the analytics engine module 172 can be a software component of some other commercially available Video Management Software (VMS) that provides similar video analytics functionality. The analytics engine module 172 can, in some examples, use the descriptive characteristics of the person's or object's appearance for searching purposes. Examples of these characteristics include the person's or object's shape, size, textures and color.

The illustrated server system 108 also includes a server-device stream manager 173 and a server-client stream manager 174. The server-device stream manager 173 is configured to control the streaming of surveillance video from any one or more of the video cameras 169 to the server system 108. As will be appreciated by those skilled in the art, the server-device stream manager 173 can carry out video processing (for example, de-multiplexing) to facilitate storing of surveillance video in the storage 190 or passing the streamed surveillance video to the server-client stream manager 174 for further processing. Regarding the server-client stream manager 174, just as the server-device stream manager 173 is configured to control the streaming of surveillance video from the video cameras 169 to the server system 108, so too the server-client stream manager 174 provides a complimentary function as between the server system 108 and the computer terminal 104. Some further non-limiting example details of the server-device stream manager 173 and the server-client stream manager 174 may be found in commonly owned US Pat. Publ. No 2015/0201198.

Still with reference to FIG. 1, the server system 108 also includes an object profile manager 175. The object profile manager 175 is configured to manage object profiles including, for example, creation of new object profiles and managing the generation and storage of profile snapshots (all of which are subsequently herein described in more detail) to support searching for one or more objects-of-interest (also subsequently herein described in more detail).

The server system 108 also includes number of other software components 176. These other software components will vary depending on the requirements of the server system 108 within the overall system. As just one example, the other software components 176 might include special test and debugging software, or software to facilitate version updating of modules within the server system 108. The server system 108 also includes one or more data stores 190. In some examples, the data store 190 comprises one or more databases 191 which facilitate the organized storing of recorded surveillance video, including surveillance video to be exported in redacted and/or otherwise modified form in accordance with example embodiments. Also, as will be appreciated by those skilled in the art, the database(s) 191 can store an identification (ID) for each unique object within the VMS of the surveillance system 100. For instance, in accordance with some examples, the object profile manager 175 stores (whenever a track is closed out, in a respective ID-storing database of the databases 191) a new ID for a new object. Also stored is the profile associated with the new ID. Alternatively, and in accordance with some alternative examples, the object profile manager 175 stores (after elapse of a first timer countdown commencing after initial detection and appearance of an object within an FOV of any of the cameras 169) a new ID for a new object in the aforementioned ID-storing database. With the timer approach, a single ID may have multiple associated profiles (i.e. one-to-many relationship).

Regarding the video cameras 169, each of these is formed by an assembly of electronic part within a housing including, for example, an image sensor and a camera module 198. In some examples, the camera module 198 includes one or more specialized integrated circuit chips to facilitate processing and encoding of surveillance video before it is even received by the server system 108. For instance, the specialized integrated circuit chip may be a System-on-Chip (SoC) solution that includes both an encoder and a Central Processing Unit (CPU), thereby permitting the camera module 198 to carry out: i) the processing and encoding functions; and ii) object detection, object classification and object tracking.

Also, in some examples, part of the processing functions of the camera module 198 includes creating metadata for recorded surveillance video. For instance, metadata may be generated relating to one or more foreground areas that the camera module 198 has detected, and the metadata may define the location and reference coordinates of the foreground visual object within the image frame. For example, the location metadata may be further used to generate a bounding box, typically rectangular in shape, outlining the detected foreground visual object. The image within the bounding box may be extracted for inclusion in metadata. The extracted image may alternately be smaller then what was in the bounding box or may be larger then what was in the bounding box. The size of the image being extracted can also be close to, but outside of, the actual boundaries of a detected object.

In some examples, the camera module 198 includes a number of submodules for video analytics such as, for instance, an object detection submodule, an instantaneous object classification submodule, a temporal object classification submodule and an object tracking submodule.

Regarding the object detection submodule, such a submodule can be provided for detecting objects appearing in the field of view of the camera 169. The object detection submodule may employ any of various object detection methods understood by those skilled in the art such as, for example, motion detection and/or blob detection.

Regarding the object tracking submodule that may form part of the camera module 198, this may be operatively coupled to both the object detection submodule and the temporal object classification submodule. The object tracking submodule may be included for the purpose of temporally associating instances of an object detected by the object detection submodule. The object tracking submodule may also generate metadata corresponding to visual objects it tracks.

Regarding the instantaneous object classification submodule that may form part of the camera module 198, this may be operatively coupled to the object detection submodule and employed to determine a visual objects type (such as, for example, human, vehicle or animal) based upon a single instance of the object. The input to the instantaneous object classification submodule may optionally be a sub-region of an image in which the visual object-of-interest is located rather than the entire image frame.

Regarding the temporal object classification submodule that may form part of the camera module 198, this may be operatively coupled to the instantaneous object classification submodule and employed to maintain class information of an object over a period of time. The temporal object classification submodule may average the instantaneous class information of an object provided by the instantaneous classification submodule over a period of time during the lifetime of the object. In other words, the temporal object classification submodule may determine a type of an object based on its appearance in multiple frames. For example, gait analysis of the way a person walks can be useful to classify a person, or analysis of the legs of a person can be useful to classify a bicycler. The temporal object classification submodule may combine information regarding the trajectory of an object (e.g. whether the trajectory is smooth or chaotic, whether the object is moving or motionless) and confidence of the classifications made by the instantaneous object classification submodule averaged over multiple frames. For example, determined classification confidence values may be adjusted based on the smoothness of trajectory of the object. The temporal object classification submodule may assign an object to an unknown class until the visual object is classified by the instantaneous object classification submodule subsequent to a sufficient number of times and a predetermined number of statistics having been gathered. In classifying an object, the temporal object classification submodule may also take into account how long the object has been in the field of view. The temporal object classification submodule may make a final determination about the class of an object based on the information described above. The temporal object classification submodule may also use a hysteresis approach for changing the class of an object. More specifically, a threshold may be set for transitioning the classification of an object from unknown to a definite class, and that threshold may be larger than a threshold for the opposite transition (for example, from a human to unknown). The temporal object classification submodule may aggregate the classifications made by the instantaneous object classification submodule.

As explained above, the camera module 198 is configured to carry out object detection, object classification and object tracking. In some examples, the camera module 198 is further configured to create an object profile following the end of tracking of an object. In other examples, creation of an object profile may also occur in other circumstances. For instance, a track of an object need not be closed out only when the object leaves the FOV of one of the cameras 169, but can instead be closed out in other instances. Also in timer embodiments disclosed herein elapse of a timer countdown (or count-up as the case may be) can cause a profile snapshot to be obtained.

Regarding such a timer and its respective timer countdown/count-up, these can start when, for example, the object enters the field of view or right after a previous countdown/count-up has reached the timed out value. One impact of a timer implementation is to mitigate against special condition-specific scenarios where an object that appears in the FOV of a camera does not have any ID in the system for a long time such as, for example, when an object lurks within the FOV of that one camera without at some point moving enough such that the object effects departure from the FOV of the camera.

The timer approach can be applied to either all of the cameras 169, or alternatively only a selected subset of the cameras 169. Selection of the subset can be based on factors including, for example, type of camera and likelihood of the camera supporting superior facial detection relative to the other cameras. Additionally, it is also contemplated that classification can be used as a basis for whether a timer should be used, or the value of it (for example, only humans for facial recognition), and it is also contemplated that object motion can be used as a basis for whether a timer should be used, or the value of it (for example, no timer or suspended timer in the case of a parked vehicle). Other variations are also contemplated, and furthermore the use, creation and storage of object profiles within the surveillance system 100 is explained herein subsequently in more detail.

In some examples, the camera module 198 is able to detect humans and extract images of humans with respective bounding boxes outlining the human objects (for example, human full body, human face, etc.) for inclusion in metadata which along with the associated surveillance video may transmitted to the server system 108. At the system 108, the media server module 168 can process extracted images and generate signatures (e.g. feature vectors) to represent objects. In computer vision, a feature descriptor is generally known as an algorithm that takes an image and outputs feature descriptions or feature vectors. Feature descriptors encode information, i.e. an image, into a series of numbers to act as a numerical "fingerprint" that can be used to differentiate one feature from another. Ideally this information is invariant under image transformation so that the features may be found again in another image of the same object. Examples of feature descriptor algorithms are SIFT (Scale-invariant feature transform), HOG (histogram of oriented gradients), and SURF (Speeded Up Robust Features).

In accordance with at least some examples, a feature vector is an n-dimensional vector of numerical features (numbers) that represent an image of an object processable by computers. By comparing the feature vector of a first image of one object with the feature vector of a second image, a computer implementable process may determine whether the first image and the second image are images of the same object.

Similarity calculation can be just an extension of the above. Specifically, by calculating the Euclidean distance between two feature vectors of two images captured by one or more of the cameras 169, a computer implementable process can determine a similarity score to indicate how similar the two images may be.

In accordance with at least some examples, storage of feature vectors within the surveillance system 100 is contemplated. For instance, feature vectors may are indexed and stored in the database 191 with respective video. The feature vectors may also be associated with reference coordinates to where extracted images of respective objects are located in respective video. Storing may include storing surveillance video with, for example, time stamps, camera identifications, metadata with the feature vectors and reference coordinates, etc. Different identification numbers (IDs) may be assigned to each potentially unique object-of-interest that is or was tracked across an FOV of a camera, and these IDs may be stored in the database with their relationships to the respective objects-of-interest. As previously mentioned herein, "tracks" are created in tracking, where each track encompasses one grouping of all detections pertaining to a same tracked object and each track is uniquely identifiable.

Figure 3:
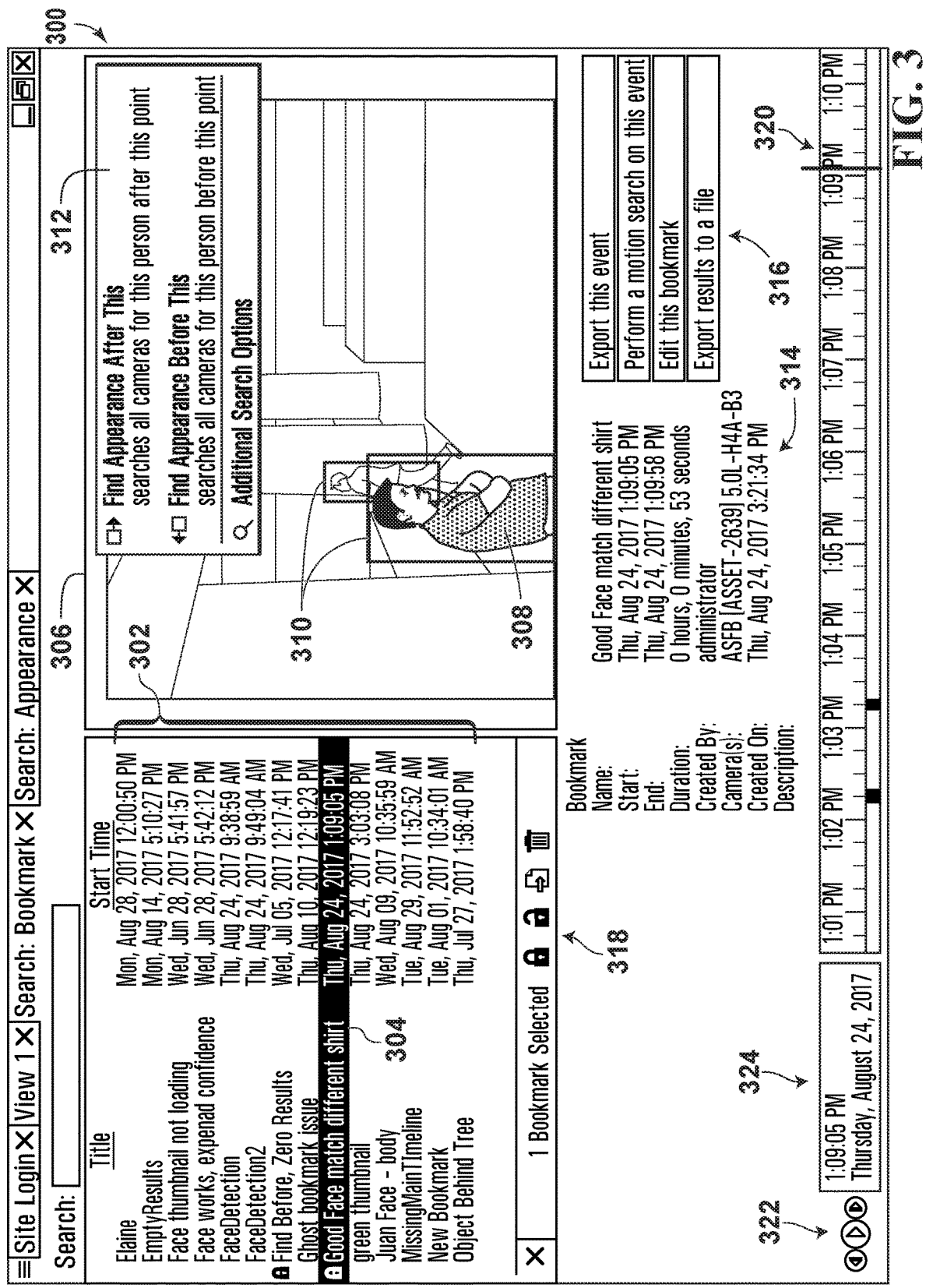
FIG. 3 shows a user interface page including an image frame of a video recording that permits a user to commence a search for a person-of-interest, according to an example embodiment implemented using the client-side video review application of FIG. 2.
Figure 4:
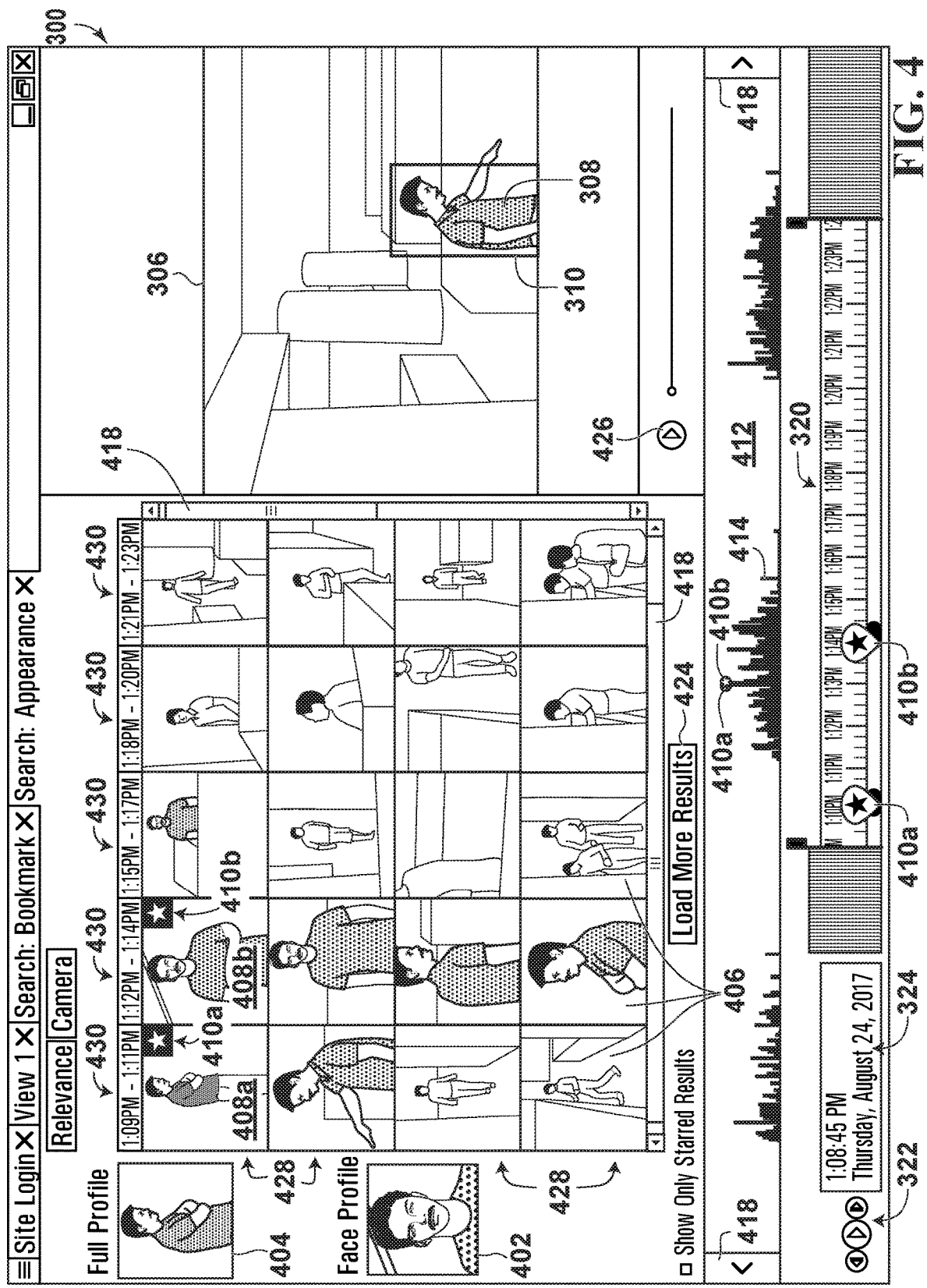
FIG. 4 shows a user interface page including image search results, with the image search results having been generated after a search for the person-of-interest has commenced, according to an example embodiment implemented using the client-side video review application of FIG. 2.

Referring now to FIGS. 3 to 4, these show user interface pages that the search UI module 202 displays to a user of the client-side video review application 144, according to one example embodiment. The depicted embodiment (FIGS. 2 to 4) permits the user of the video review application 144 to commence a search for a person-of-interest and to have a face thumbnail and a body thumbnail of the person-of-interest displayed to assist the user in identifying the person-of-interest while reviewing image search results. As used herein, a "person-of-interest" is a person that a user of the video review application 144 is attempting to locate using the surveillance system 100. The server system 108 is able to search any one or more of a collection of surveillance video recordings using any one or more of the cameras 169 based on one or both of the person-of-interest's body and face.

Although not illustrated in FIGS. 3 to 4, searches can also be run based on facets believed to be possessed by the person-of-interest, and this type of searching can be done either in combination with or in alternative to the type of search shown in FIGS. 3 and 4. With facets-based searching, the user may manipulate GUI widgets (such as, for example, selectors, check boxes, etc.) and/or enter text in text boxes to allow the video review application 144 to build a search query suitable to be received and processed by the server system 108.

Referring now to FIG. 3 in particular, there is shown a user interface page 300 including an image frame 306 of a selected video recording that permits a user of the video review application 144 to commence a search for a person-of-interest 308. The selected video recording shown in FIG. 3 is one of the collection of surveillance video recordings obtained using different cameras 169 to which the user has access via the video review application 144. The video review application 144 displays the page 300 on the terminal's 104 display 126. The user provides input to the video review application 144 via the input device 114, which may be a mouse, a touch pad or other suitable input device. In FIG. 3, displaying the image frame 306 comprises the video review application 144 displaying the image frame 306 as a still image, although in different embodiments displaying the image frame 306 may comprise playing the selected surveillance video recording or displaying live surveillance video.

The image frame 306 depicts a scene in which multiple persons are present. The server system 108 automatically identifies persons appearing in the scene that may be the subject of a search, and thus who are potential persons-ofinterest 308 to the user, and highlights each of those persons by enclosing all or part of each in a bounding box 310. In FIG. 3, the user identifies the person located in the lowest bounding box 310 as the person-of-interest 308, and selects the bounding box 310 around that person to evoke a context menu 312 that may be used to commence a search. The context menu 312 presents the user with one option to search the collection of surveillance video recordings at all times after the image frame 306 for the person-of-interest 308, and another option to search the collection of surveillance video recordings at all times before the image frame 306. The user may select either of those options to have the server system 108 commence searching for the person-of-interest 308. The input the user provides to the server system 108 via the video review application 144 to commence a search for the person-of-interest is the "search commencement user input".

In the case where the image frame 306 is from live (or almost live) video, it is contemplated that the context menu 312 may present different search options from those listed. For example, instead of the "Find Appearance After This" and "Find Appearance Before This" option, the options may instead be "Where Is This Person Now" and "Find Appearance Before This". If the "Where Is This Person Now" option is selected, the search results may include a combination of possible matches in more recently recorded video along with any matches in live video. In accordance with some examples, the video review application 144 may be configured to allow the user to set how far back in time the "Where Is This Person Now" searching will be conducted in the recorded video (for example, two minutes, five minutes, ten minutes, etc.). Also, and still in the context of the "Where Is This Person Now" search, automatic or user-configurable restrictions on the server and/or client side could be implemented based on which of the cameras 169 recorded the video. In this regard, cameras having a physical location near the camera 169 of the most recently having captured video containing the person-of-interest may be included in the search and other cameras with FOVs that the person would not have had enough time to reach could be excluded.

In FIG. 3, the user has bookmarked the image frame 306 according to which of the cameras 169 obtained it and its time index so as to permit the user to revisit that image frame 306 conveniently. Immediately below the image frame 306 is bookmark metadata 314 providing selected metadata for the selected surveillance video recording, such as its name and duration. To the right of the bookmark metadata 314 and below the image frame 306 are action buttons 316 that allow the user to perform certain actions on the selected surveillance video recording, such as to export the surveillance video recording and to perform a motion search on the recording.

Immediately to the left of the image frame 306 is a bookmark list 302 showing all of the user's bookmarks, with a selected bookmark 304 corresponding to the image frame 306. Immediately below the bookmark list 302 are bookmark options 318 permitting the user to perform actions such as to lock or unlock any one or more of the bookmarks to prevent them from being or to permit them to be changed, to export any one or more of the bookmarks, and to delete any one or more of the bookmarks.

Bordering a bottom-left edge of the page 300 are video control buttons 322 permitting the user to play, pause, fast forward, and rewind the selected surveillance video recording. Immediately to the right of the video control buttons 322 is a video time indicator 324, displaying the date and time corresponding to the image frame 306. Extending along a majority of the bottom edge of the page 300 is a timeline 320 permitting the user to scrub through the selected surveillance video recording and through the surveillance video collectively represented by the collection of surveillance video recordings.

Referring now to FIG. 4, the user interface page 300 is shown after the server system 108 has completed a search for the person-of-interest 308. The page 300 concurrently displays the image frame 306 of the selected surveillance video recording the user used to commence the search bordering a right edge of the page 300; immediately to the left of the image frame 306, image search results 406 selected from the collection of surveillance video recordings by the server system 108 as potentially corresponding to the person-of-interest 108; and, immediately to the left of the image search results 406 and bordering a left edge of the page 300, a face thumbnail 402 and a body thumbnail 404 of the person-of-interest 308.

While surveillance video is being recorded, at least one of the cameras 169 and server system 108 in real-time (or near real-time) identify when people, each of whom is a potential person-of-interest 308, are being recorded and, for those people, may optionally attempt to identify each of their faces. The server system 108 generates signatures based on the bodies of the people who are identified (and also possibly based on the faces, when identified, as well) as described above. The server system 108 may store information on whether faces were identified and the signatures as metadata together with the surveillance video recordings.

In response to the search commencement user input the user provides using the context menu 312 of FIG. 3, the server system 108 generates the image search results 406 by searching live surveillance video and the collection of surveillance video recordings for the person-of-interest 308. The server system 108 may perform a combined search that includes a body search and a face search on the collection of surveillance video recordings using the metadata recorded for the person-of-interest's 308 body and face, respectively. More specifically, the server system 108 may compare the body and face signatures of the person-of-interest 308 the user indicates he or she wishes to perform a search on to the body and face signatures, respectively, for the other people the system 108 has identified. Taking into account the user input, stored information (including, for example, aliases of objects) and information generated from one or more neural networks, the server system 108 returns the search results 406, which includes a combination of the results of the body and face searches, which the video review application 144 uses to generate the page 300. Also, it should be understood that any suitable method may be used to perform the body and face searches; for instance, as a more specific example in regards to use of neural networks as mentioned above, the server system 108 may employ a Convolutional Neural Network (CNN) when performing the body search.

In one example embodiment, the face search is done by searching the live surveillance video and the collection of surveillance video recordings for faces. Once a face is identified, the coordinates of a bounding box (noting, as eluded to before, that there is no requirement in video analytics that bounding boxes be restricted in their function to just outlining a full human body) that bounds the face (e.g., in terms of an (x,y) coordinate identifying one corner of the box, and width and height of the box) and an estimation of the head pose (e.g., in terms of yaw, pitch, and roll) are generated. A feature vector, that characterizes those faces using any one or more metrics, may be generated by, for instance, a deep learning algorithm. For example, for each face, any one or more of distance between the corners of eyes, distance between the centers of eyes, nose width, depth of eye sockets, shape of cheekbones, shape of jaw line, shape of chin, hair color, and the presence and color of facial hair may be used as metrics. Once the feature vectors are generated for the faces, the Euclidean distance between vectors for different faces may be determined and used to assess face similarity. Feature vector comparison (as described above) can also be sufficiently robust to permit the object profile manager 175 to determine, within live or very recently recorded video, that there is at least one new object requiring at least one new ID to be stored in the ID-storing database of the databases 191. As herein described, a track of an object need not be closed out only when the object leaves the FOV of one of the cameras 169, but can instead be closed out in other instances such as upon a threshold exceeding change in the appearance of the object. It is further noted that verifying whether a threshold exceeding change has occurred in relation to the appearance of an object (full body) versus detection of a new object (full body) can be assessed based on feature comparison between respective face of the object prior to threshold exceeding change and respective face of the object post-threshold exceeding change. A match would be indicative of the former, whereas no match would be indicative of the latter (assuming the VMS is operating with face matching being carried out with sufficiently high confidence values).

In at least one example embodiment, the cameras 169 generate the metadata and associated feature vectors in or nearly in real-time, and the server system 108 subsequently assesses face similarity using those feature vectors. However, in at least one alternative example embodiment the functionality performed by the cameras 169 and server system 108 may be different. For example, functionality may be divided between the server system 108 and cameras 169 in a manner different than as described above. Alternatively, one of the server system 108 and the cameras 169 may generate the feature vectors and assess face similarity.

In the illustrated example embodiment, the video review application 144 uses as the body thumbnail 404 at least a portion of the image frame 306 that is contained within the bounding box 310 highlighting the person-of-interest. The video review application 144 uses as the face thumbnail 402 at least a portion of one of the face search results that satisfy a minimum likelihood that that result correspond to the person-of-interest's 308 face; in one example embodiment, the face thumbnail 402 is drawn from the result of the face search that is most likely to correspond to the person-of-interest's 308 face. Additionally or alternatively, the result used as the basis for the face thumbnail 402 is one of the body search results that satisfies a minimum likelihood that the result correspond to the person-of-interest's 308 body. In another example embodiment, the face thumbnail 402 may be selected as at least a portion of the image frame 306 that is contained within the bounding box 310 highlighting the person-of-interest 308 in FIG. 3.

In FIG. 4, the image search results 406 comprise multiple images arranged in an array comprising n rows 428 and m columns 430, with n=1 corresponding to the array's topmost row 428 and m=1 corresponding to the array's leftmost column 430. The results 406 are positioned in a window along the right and bottom edges of which extend scroll bars 418 that permit the user to scroll through the array. In FIG. 4, the array comprises at least 4×5 images, as that is the portion of the array that is visible without any scrolling using the scroll bars 418.

Each of the columns 430 of the image search results 406 corresponds to a different time period of the collection of surveillance video recordings. In the example of FIG. 4, each of the columns 430 corresponds to a three minute duration, with the leftmost column 430 representing search results 406 from 1:09 p.m. to 1:11 p.m., inclusively, the rightmost column 430 representing search results 406 from 1:21 p.m. to 1:23 p.m., inclusively, and the middle three columns 430 representing search results 406 from 1:12 p.m. to 1:20 p.m., inclusively.

In the depicted embodiment, all of the search results 406 satisfy a minimum likelihood that they correspond to the person-of-interest 308; for example, in certain embodiments the video review application 144 only displays search results 406 that have at least a 25% likelihood ("match likelihood threshold") of corresponding to the person-of-interest 308. However, in certain other embodiments, the video review application 144 may use a non-zero match likelihood threshold that is other than 25%, or may display search results 406 in a manner not specifically based on a match likelihood threshold.

In FIG. 4, the body and face thumbnails 404, 402 include at least a portion of a first image 408a and a second image 408b, respectively, which include part of the image search results 406. The first and second images 408a,b, and accordingly the body and face thumbnails 404,402, are different in FIG. 4; however, in different embodiments (not depicted), the thumbnails 404,402 may be based on the same image. Overlaid on the first and second images 408a,b are a first and a second indicator 410a,b, respectively, indicating that the first and second images are the bases for the body and face thumbnails 404,402. In FIG. 4 the first and second indicators 410a,b are identical stars, although in different embodiments (not depicted) the indicators 410a,b may be different.

Located immediately below the image frame 306 of the selected surveillance video recording are play/pause controls 426 that allow the user to play and pause the selected surveillance video recording. Located immediately below the horizontal scroll bar 418 beneath the image search results 406 is a load more results button 424, which permits the user to prompt the video review application 144 for additional tranches of search results 406. For example, in one embodiment, the video review application 144 may initially deliver at most a certain number of results 406 even if additional results 406 exceed the match likelihood threshold. In that example, the user may request another tranche of results 406 that exceed the match likelihood threshold by selecting the load more results button 424. In certain other embodiments, the video review application 144 may be configured to display additional results 406 in response to the user's selecting the button 424 even if those additional results 406 are below the match likelihood threshold.

Spanning the width of the page 300 and located below the thumbnails 402,404, search results 406, and image frame 306 is an appearance likelihood plot for the person-of-interest 308 in the form of a bar graph 412. The bar graph 412 depicts the likelihood that the person-of-interest 308 appears in the collection of surveillance video recordings over a given time span. In FIG. 4, the time span is divided into time periods 416 of one day, and the entire time span is approximately three days (from August 23-25, inclusive). Each of the time periods 416 is further divided into discrete time intervals, each of which is represented by one bar 414 of the bar graph 412. The bar graph 412 is bookmarked at its ends by bar graph scroll controls 418, which allow the user to scroll forward and backward in time along the bar graph 412.

To determine the bar graph 412, the server system 108 determines, for each of the time intervals, a likelihood that the person-of-interest 308 appears in the collection of surveillance video recordings for the time interval, and then represents that likelihood as the height of the bar 414 for that time interval. In this example embodiment, the server system 108 determines that likelihood as a maximum likelihood that the person-of-interest 308 appears in any one of the collection of surveillance video recordings for that time interval. In different embodiments, that likelihood may be determined differently. For example, in one different embodiment the server system 108 determines that likelihood as an average likelihood that the person-of-interest 308 appears in the image search results 406 that satisfy the match likelihood threshold.

As in FIG. 3, the page 300 of FIG. 4 also includes the timeline 320, video control buttons 322, and video time indicator 324 extending along the bottom of the page 300.

The video review application 144 permits the user to provide match confirmation user input regarding whether at least one of the image search results 406 depicts the person-of-interest 308. The user may provide the match confirmation user input by, for example, selecting one of the image search results 406 to bring up a context menu (not shown) allowing the user to confirm whether that search result 406 depicts the person-of-interest 308. In response to the match confirmation user input, the server system 108 in the depicted embodiment determines whether any match likelihoods change and, accordingly, whether positioning of the image search results 406 is to be changed in response to the match confirmation user input. For example, in one embodiment when the user confirms one of the results 406 is a match, the server system 108 may use that confirmed image as a reference for comparisons when performing one or both of face and body searches. When the positioning of the image search results is to be changed, the video review application 144 updates the positioning of the image search results 406 in response to the match confirmation user input. For example, the video review application 144 may delete from the image search results 406 any result the user indicates does not contain the person-of-interest 308 and rearrange the remaining results 406 accordingly.

Figure 5:
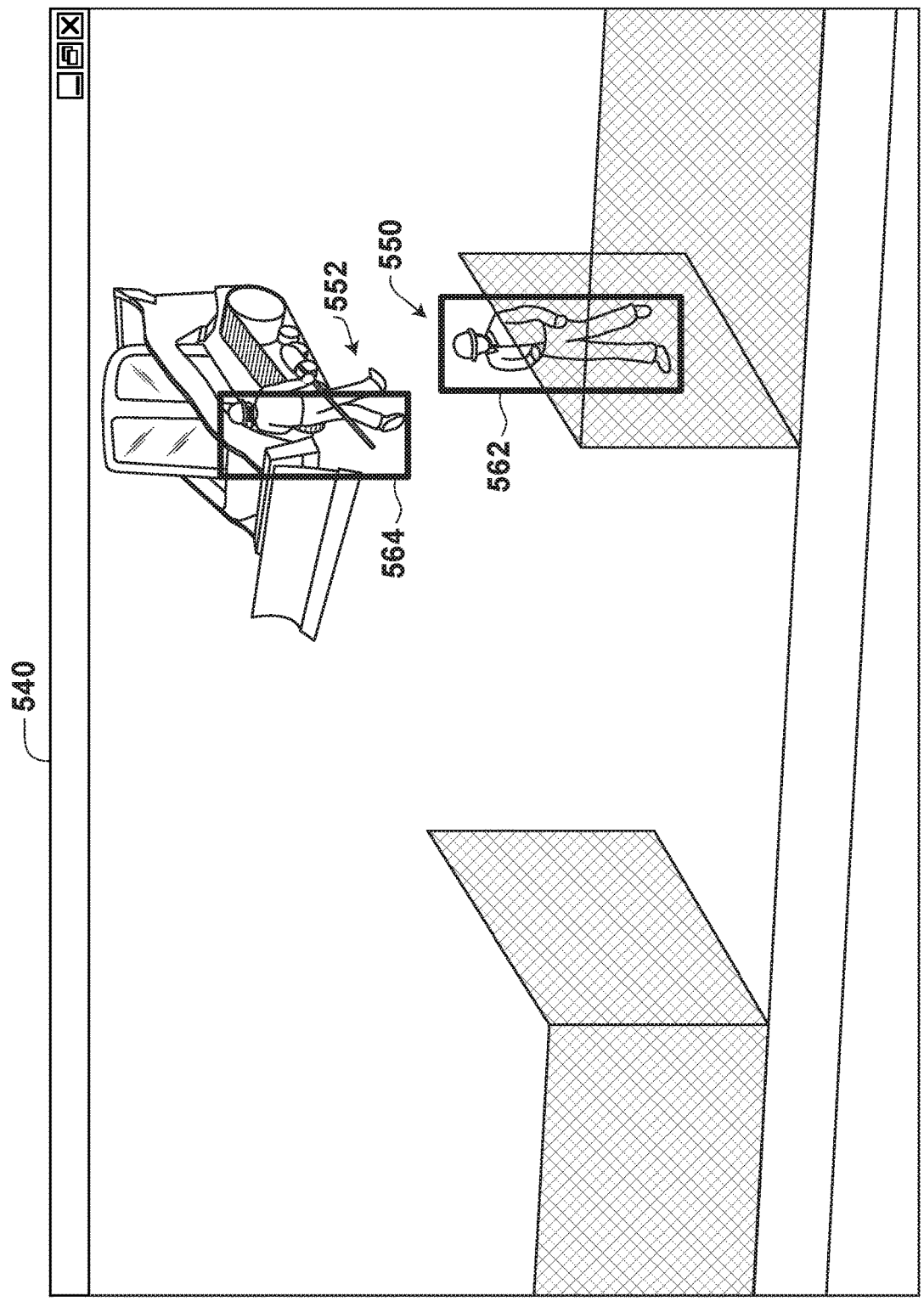
FIG. 5 shows a video image captured by a surveillance camera at time $t_x$.

Reference will now be made to FIG. 5 which shows a video image frame 540 captured by one of the cameras 169 of the surveillance system 100 (FIG. 1) at time $t_x$. Two people (objects) 550 and 552 are well within the FOV of the surveillance camera. A bounding box 562 outlines the detected object 550 (full body). Similarly a bounding box 564 outlines the detected object 552 (full body).

Figure 6:
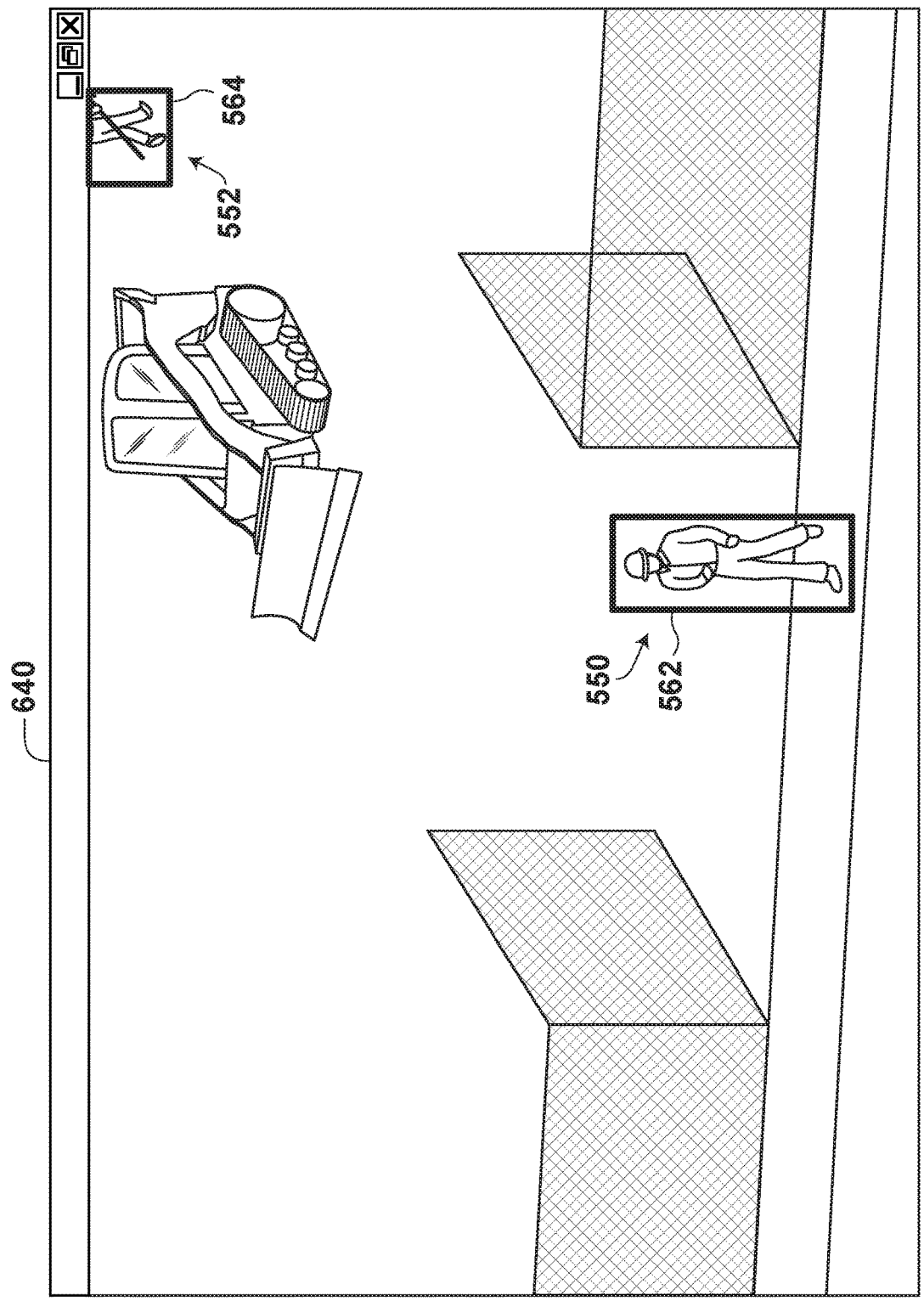
FIG. 6 show a video image captured by the same camera capturing the video image of FIG. 5, but captured at a later point in time $t_{x+i}$.

Turning now to FIG. 6, shown therein is a video image frame 640 captured with the same camera (and FOV) as for the video image frame 540 of FIG. 5. While the video image frame 640 is similar to the video image frame 540, it correspond to a later time of capture $t_{x+i}$. For example, it is quite evident that the objects 550 and 552 have moved to respective different locations than where they were in the video image frame 540 (which follows since that video frame was captured earlier in time). Particularly noteworthy is object 552 which, along with its respective bounding box 564 have moved into the upper right corner of the image, which means that the object 552 is about to leave the FOV of the camera 169 that captured the video image frame 640.

Figure 7:
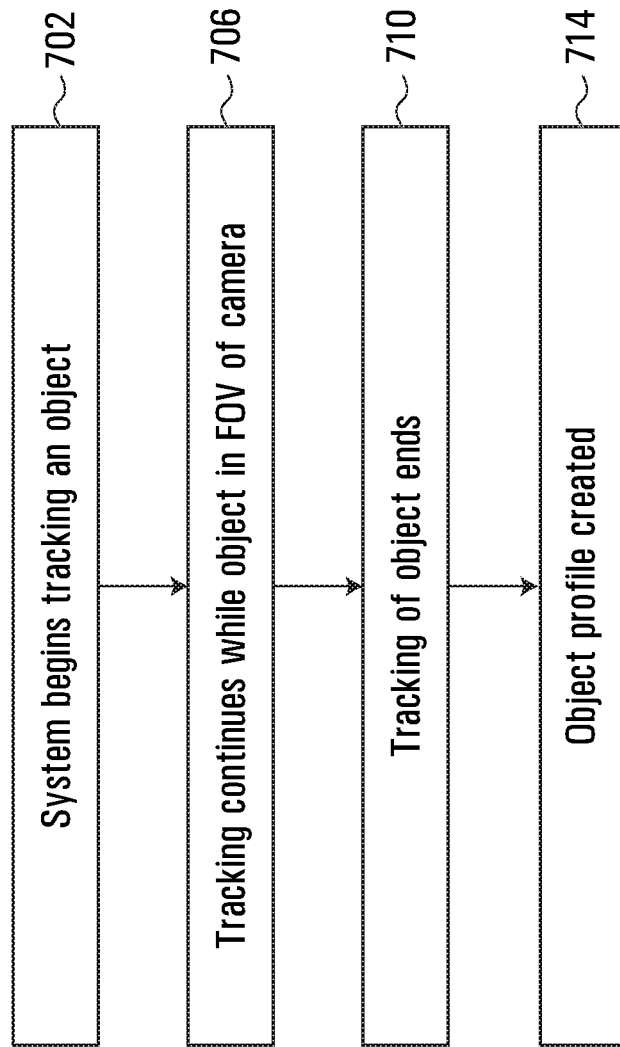
FIG. 7 is a flow chart illustrating a method for creating an object profile in accordance with an example embodiment.

Reference will now be made to FIG. 7. FIG. 7 illustrates a method 700 for creating an object profile in accordance with an example embodiment. First, a system begins tracking (702) an object that has entered an FOV of a camera. For example, at some point in time $t_{x-j}$ (not illustrated in the drawings) the person 552 (FIGS. 5 and 6) will enter the FOV of one of the cameras 169, and the surveillance system 100 will detect the person 552 and begin tracking him.

Next the tracking continues (706) and the system accumulates data on the tracked object while that tracked object remains within the FOV of a same camera. For example, at the point in time $t_x$ (FIG. 5) the person 552 is being tracked within the surveillance system 100 and data on the person 552 is being accumulated.

Eventually the tracking of the object will end (710). For example, at the point in time $t_{x+i}$ (FIG. 6) the person 552 is walking out of the FOV of the camera, and the surveillance system 100 will detect this (track lost) and, in response, will stop tracking the person 552. Also, it will be understood by those skilled in the art that walking out of the FOV of a camera is not the only way in which a track can become lost (or tracking may otherwise end). Take tracking errors for example (for instance, occlusion situations, a rapid change in object motion, etc.): these can potentially cause tracking to end.

Finally, following the end of the tracking 710, an object profile is created (714). For example, the camera 169 of the surveillance system 100 may create and send a data structure (containing a summary of the person 552) to the server system 108. In some examples, the summary of the person 552 includes an exemplary (for example, best) body and/or face image. Also, it will be understood that, in at least some examples, retrieval of an object profile from the storage 190 may facilitate re-identification feature extraction.

Figure 8:
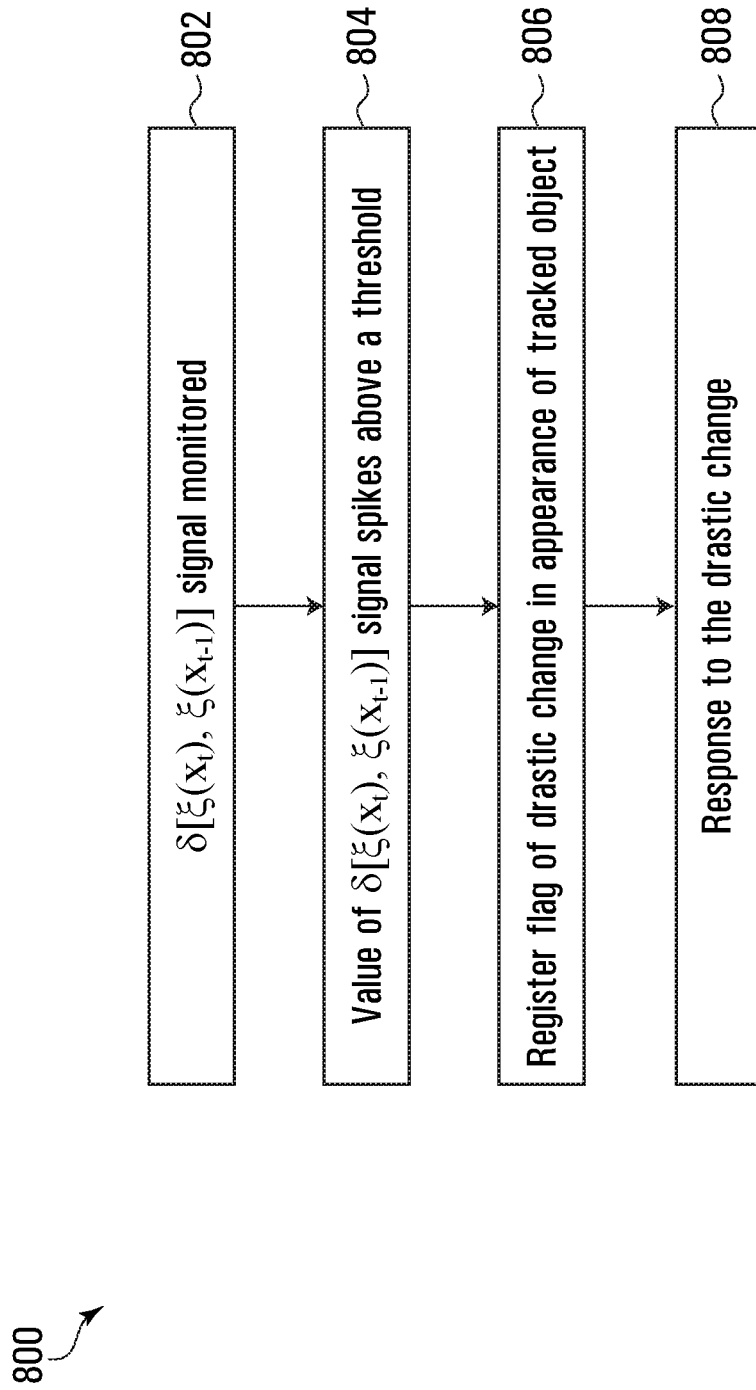
FIG. 8 is a flow chart illustrating a method for detecting a drastic change of a tracked object's appearance in accordance with an example embodiment.

In accordance with a number of example embodiments, the change of a tracked object's appearance over time can be monitored, and occurrence of any drastic change (based on some pre-set threshold, for example) can trigger a response. In this regard, FIG. 8 illustrates a method 800 for detecting a drastic change of a tracked object's appearance in accordance with an example embodiment.

First, a $\delta(\xi(x_t),\xi(x_{t-i}))$ signal ("appearance change signal") is monitored (802), where:

$\xi$ is a visually isometric projection of an object chip (noting that a "chip" may be understood by those skilled in the art as being the extracted image within a bounding box) to some feature space. As will be appreciated by those skilled in the art, examples of feature spaces include a stick figure, HSV histogram, etc.

$\delta$ is a distance metric in the feature space measuring the similarity of the projected images (for example, Euclidean distance).

$x_t$ is the image of a chip of the tracked object at time step t. (It will be noted that the "−1" in $x_{t-i}$ does not mean exactly one frame earlier in time, but rather can be either of: i) any suitable number of frames earlier in time; or ii) for a frame rate-independent approach, some suitable time difference, provided that the reliability of the calculation is sufficiently maintained. In fact, in some instances making a calculation every new frame may be potentially less desirable for reasons of incurring high computational expense and/or lower reliability of the result being obtained).

Also, it will be understood that variations of the $\delta(\xi(x_t),\xi(x_{t-i}))$ signal are contemplated within the scope of example embodiments. For example, a smoothed out version of this signal could mitigate against impact of noise.

Figure 9:
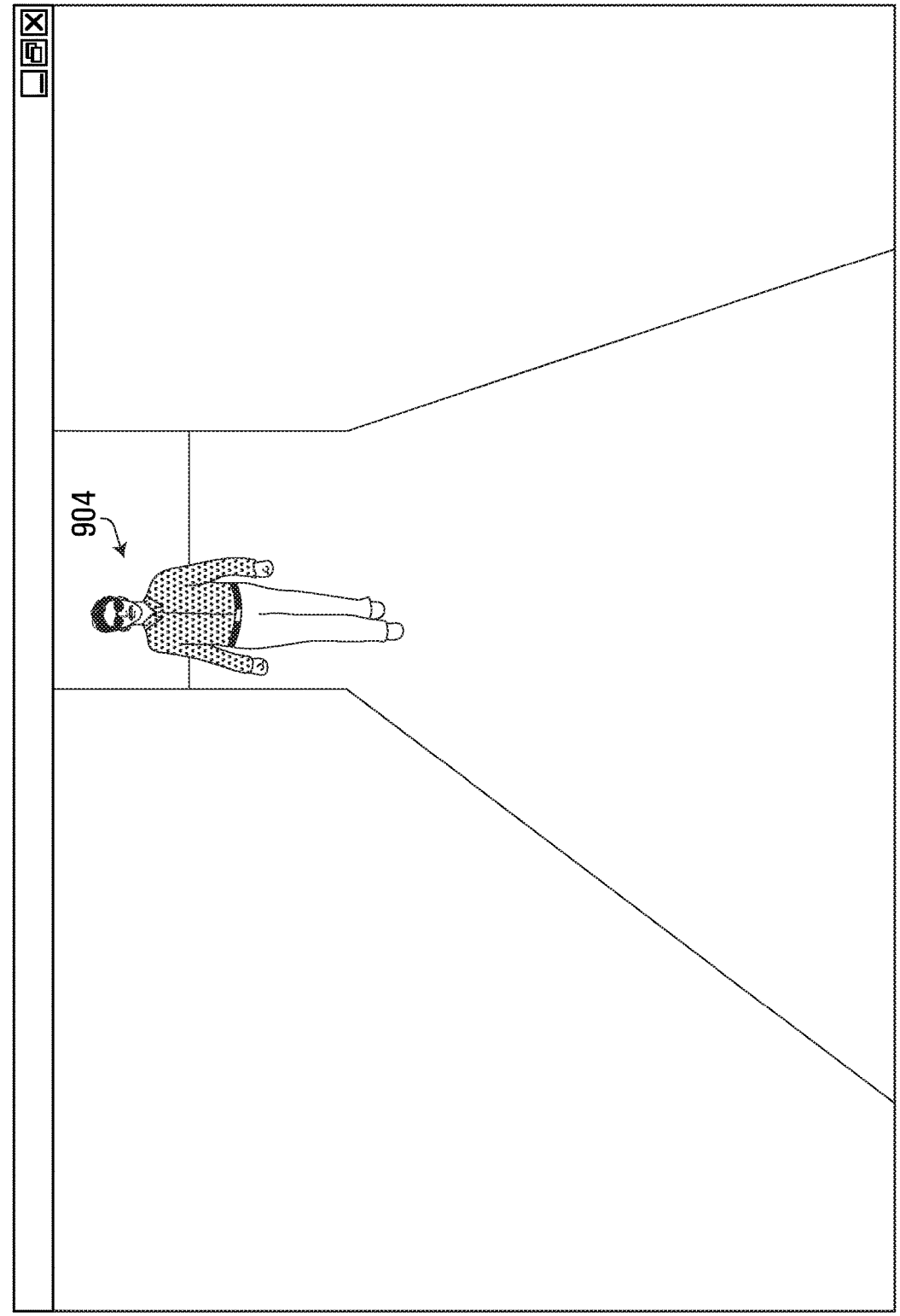
FIGS. 9 and 10 show an example of a potential drastic change in a person's appearance as captured by a camera as between a first point in time and a later second point in time.
Figure 10:
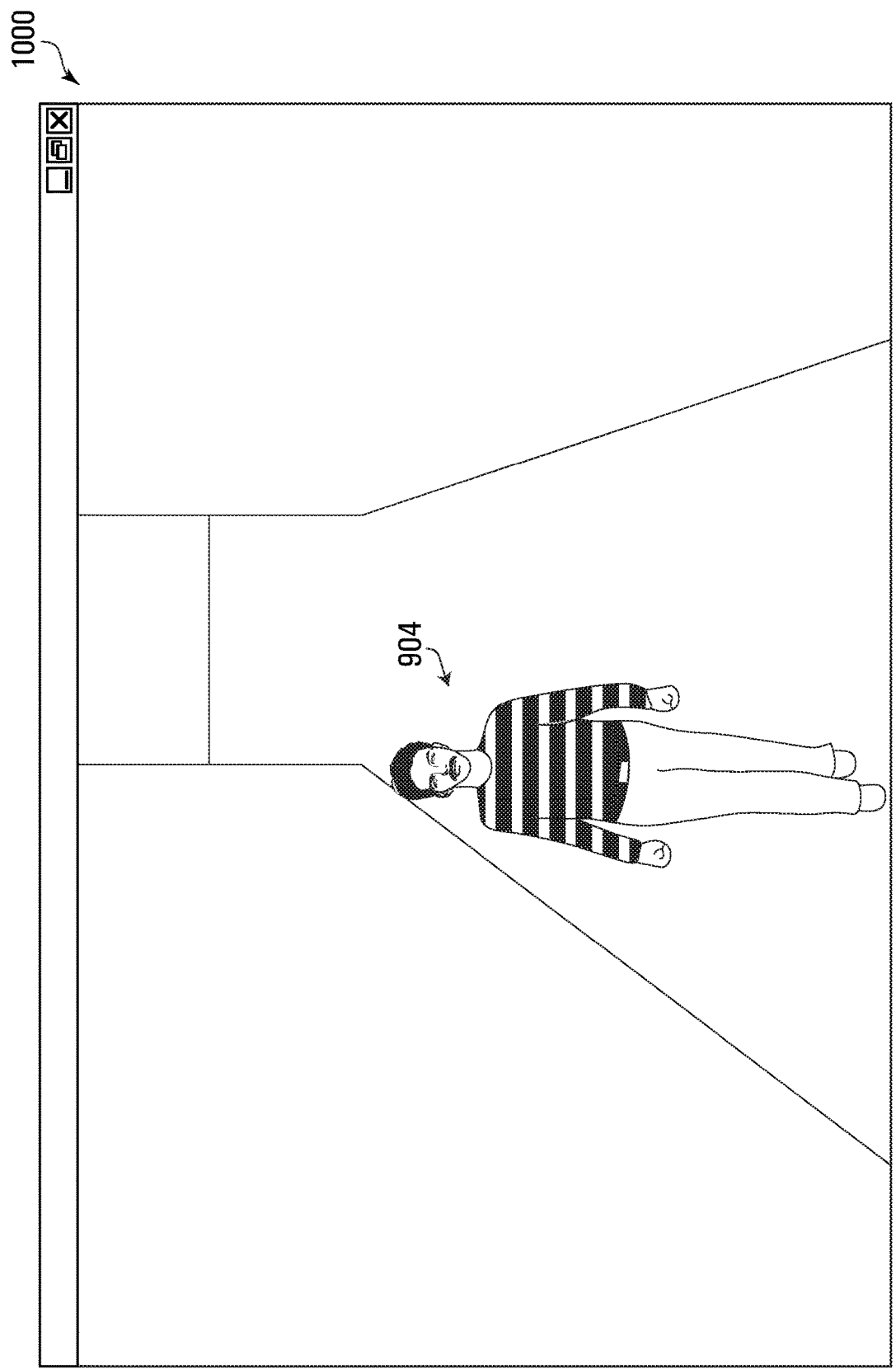

Next, at a later point in time after the monitoring 802 has begun, the appearance change signal spikes (804) to a value in excess of some threshold. Take for example a person who significantly changes his clothing or other attire at a certain point in time, and in this regards reference will now be made to FIG. 9 and FIG. 10 which show, at different points in time, a first video image frame 900 of a man 904 and second video image frame 1000 of the man 904 respectively. In FIG. 9 (corresponding to a first point in time) the man 904 is wearing a dress shirt having certain observable characteristics (for example, pattern, colour, etc.) impacting appearance of the person in a first manner. In FIG. 10 (corresponding to a second, later point in time) the clothes and attire of the man 904 has very much changed in that he is no longer wearing glasses and the dress shirt has been removed to expose a piece of clothing having certain observable characteristics that impact appearance of the person in a second manner different than before. Thus, this is an example of a change that could be expected to cause the appearance change signal to spike significantly enough to exceed a set threshold that establishes a boundary between a non-drastic and a drastic change. (It should be understood that a change of multiple items of clothes/attire on a person is not a prerequisite for a drastic change, some single change including, for example, one article of clothing, may be sufficient.)

Next, the spike in the appearance change signal is registered (806) as a flag that the appearance of the tracked object has changed dramatically. Thus, a threshold exceeding change is detected within the surveillance system 100.

Finally, a responding action (808) occurs. For example, the camera 169 currently tracking the man 904 may send a new object profile to the server system 108. In response to the new object profile being sent to the server system 108, object profile manager 175 may cause a new alias to be created within the database 191 of the storage 190 along with an appropriate data relationship being created between the old alias and the new alias (for example, the new alias of the tracked person becomes formally related to the old alias of the tracked person as an intra-class variant or an intra-tracklet variant). In accordance with some examples, a plurality of aliases of a same person are stored under the same ID establishing aliases having a matching, common ID as related to each other.

It will be understood that while both the method 700 (FIG. 7) and the method 800 (FIG. 8) are consistent with creation of a new object profile, there are notable differences as to the new object profile being generated. In accordance with the method 700, generation and sending of the object profile is just when the tracked object is finalized (the tracker can no longer associate any new detections with the respective track). Thus the object profile generated by the method 700 is only available for person-of-interest searching after the tracked object has vanished from the FOV of the camera 169. By contrast, the method 800 may better facilitate making tracked objects that have not yet left the FOV of a camera searchable, because the method 800 supports and is consistent with the camera generating object profiles while the respective object is still being tracked. In this manner the method 800 supports and is consistent with facilitating live searches to find a person-of-interest.

It should also be understood that alias relationships may also impact values of the match likelihoods that have been herein described. For example, say a feature vector corresponding to an instance of a first alias of a person captured in certain first video is very similar to the feature vector for the reference for the person being sought in the automated search. Now let's say that another feature vector corresponding to an instance of a second alias of that person captured in certain second video is not similar to the feature vector for the reference for the person being sought in the automated search. The impact on the value of the match likelihood may be seen here. In particular, the existence of an alias relationship between the first and second aliases may cause a higher match likelihood to be assigned to the second video then would be the case absent the alias relationship.

Figure 11:
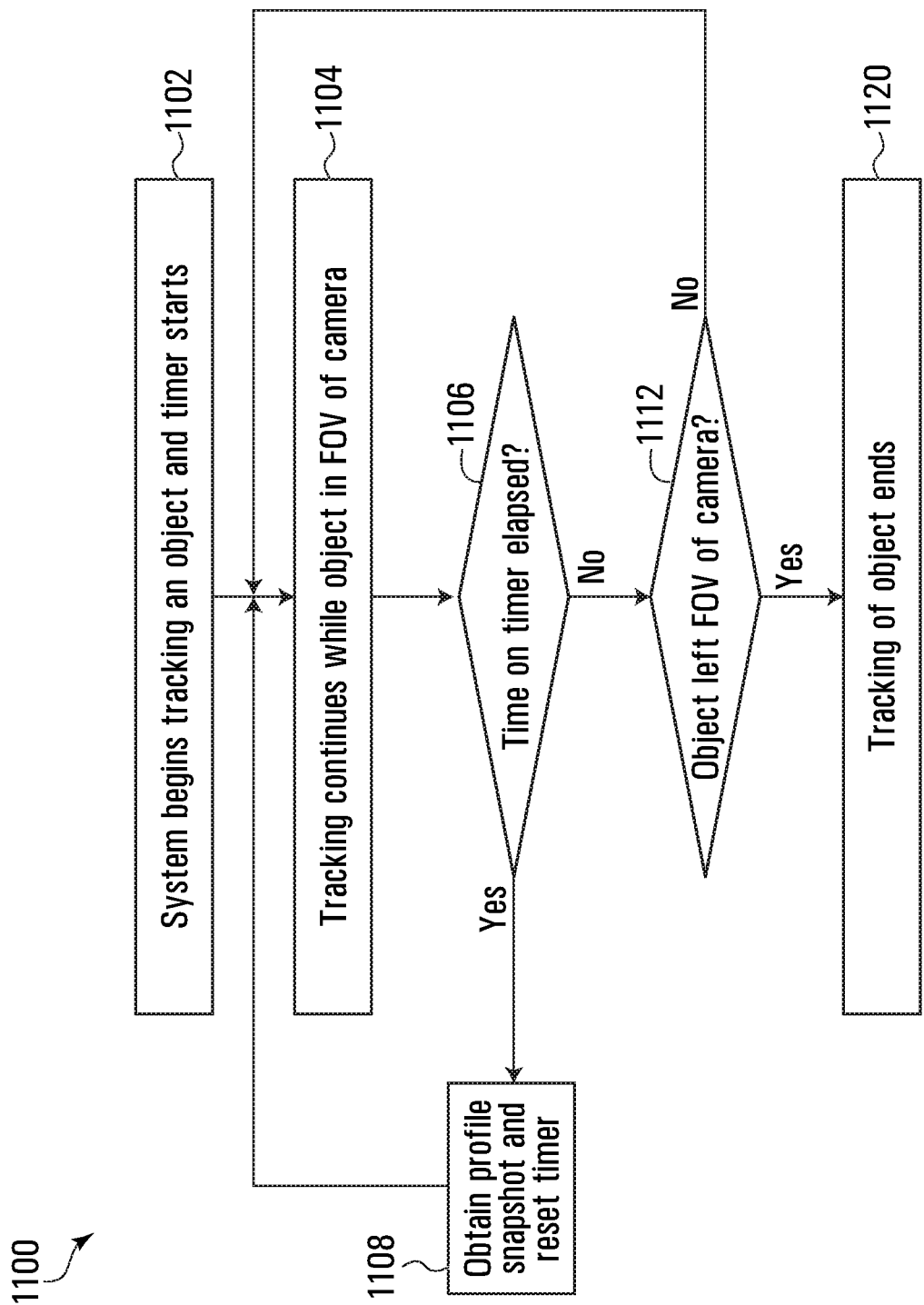
FIG. 11 is a flow chart illustrating a method for obtaining, in accordance with an example embodiment and in an interval timer-based manner, profile snapshots of an object.

Reference will now be made to FIG. 11. FIG. 11 is a flow chart illustrating a method 1100 for obtaining, in accordance with an example embodiment and in an interval timer-based manner, profile snapshots of an object. First, a system begins tracking (1102) an object and a timer starts. (It will be noted that the details regarding this timer were herein discussed in preceding paragraphs.) Next, tracking continues (1104) while the object is in the FOV of one of the cameras 169.

Continuing on, the method 1100 also includes checking (1106) if the time on the timer has elapsed. If yes, a profile snapshot is obtained (1108) and the timer is reset. (For example, in the case of a timer that operates by counting down to zero, the value is reset to some initial value greater than zero, and then the timer countdown begins again.)

By contrast if the time on the timer has not elapsed, the method 1100 continues including checking (1112) whether the object has left the FOV of the camera 169. If no, the tracking 1104 continues. If yes, tracking of the object ends (1120).

Certain adaptations and modifications of the described embodiments can be made. For example, with respect to the client-side video review application 144 (FIGS. 1 and 2), this has been herein described as software installed on the client terminal 104 (e.g. packaged software); however in some alternative example embodiments implementation of the UI can be achieved with less installed software through the use of a web browser application (e.g. one of the other applications 152 shown in FIG. 1). A web browser application is a program used to view, download, upload, surf, and/or otherwise access documents (for example, web pages). In some examples, the browser application may be the well-known Microsoft® Internet Explorer®. Of course other types of browser applications are also equally possible including, for example, Google® Chrome™. The browser application reads pages that are marked up (for example, in HTML). Also, the browser application interprets the marked up pages into what the user sees rendered as a web page. The browser application could be run on the computer terminal 104 to cooperate with software components on the server system 108 in order to enable a computer terminal user to carry out actions related to providing input in order to, for example, facilitate identifying same individuals or objects appearing in a plurality of different surveillance video recordings. In such circumstances, the user of the computer terminal 104 is provided with an alternative example user interface through which the user inputs and receives information in relation to the surveillance video recordings.

Although creation of a new alias due to a drastic appearance change (as has been herein described) may be triggered in part or in whole by some deliberate (non-passive) action by a person-of-interest (for example, the person-of-interest taking off or adding a piece of clothing like a coat or shirt), creation of the new alias can also be triggered by alternative occurrences such as, for example, a person changing his orientation relative to a camera so as to expose a different side of his shirt to the camera, where the two sides of the shirt are entirely different in appearance.

Although example embodiments have described a reference image for a search as being taken from an image within recorded surveillance video, in some example embodiments it may be possible to conduct a search based on a scanned photograph or still image taken by a digital camera. This may be particularly true where the photo or other image is, for example, taken recent enough such that the clothing and appearance is likely to be the same as what may be found in the surveillance video recordings.

Therefore, the above discussed embodiments are considered to be illustrative and not restrictive, and the invention should be construed as limited only by the appended claims.

The invention claimed is:

1. A method comprising:
tracking a moving object-of-interest at least substantially over a period of time starting when the object-of-interest enters a defined field of view of a camera and ending when the object-of-interest exits the field of view;
detecting, at a point in time in-between the start and end of the period of time, a threshold exceeding change in an appearance of the object-of-interest;
creating a new object profile for the object-of-interest in response to the detecting of the threshold exceeding change; and
storing at least first and second object profiles for the object-of-interest, and
wherein the first object profile relates to the object-of-interest prior to occurrence of the threshold exceeding change, and the second object profile relates to the object-of-interest after the occurrence of the threshold exceeding change.

2. The method of claim 1 wherein quantifying the change in the appearance of the object-of-interest includes measuring a similarity of two isometric projections, onto a feature space, of two respective object chips from two different video frames captured by the camera.

3. The method of claim 2 wherein a temporal spacing between a first video frame of the two different video frames and a second video frame of the two different video frames is greater than a single video frame.

4. The method of claim 1 wherein the second object profile is related to the first object profile as an intra-class variant or an intra-tracklet variant.

5. The method of claim 1 further comprising transmitting, from the camera to a server, object profile data related to the object-of-interest, and
wherein the transmitting is in response to at least the creating of the new object profile.

6. The method of claim 5 further comprising storing the object profile data as a new entry within a database of the server.

7. The method of claim 1 wherein the object-of-interest is a full body of a person or a head of the person.

8. The method of claim 1 wherein the object-of-interest is a full body of a person.

9. A camera comprising:
an image sensor configured to capture a plurality of video image frames that correspond to a defined field of view of the camera and include a moving object-of-interest; and
a processor configured to execute instructions to carry out a computer-implemented method that includes:
tracking the object-of-interest at least substantially over a period of time starting when the object-of-interest enters the field of view and ending when the object-of-interest exits the field of view;
detecting, at a point in time in-between the start and end of the period of time, a threshold exceeding change in an appearance of the object-of-interest; and
creating a new object profile for the object-of-interest in response to the detecting of the threshold exceeding change, and
wherein:
the camera is configured to transmit the new object profile to be stored outside the camera along with an old object profile that relates to the object-of-interest prior to occurrence of the threshold exceeding change, and
the new object profile and the old object profile collectively being a plurality of object profiles for the object-of-interest.

10. The camera of claim 9 wherein the new object profile is related to the old object profile as an intra-class variant or an intra-tracklet variant.

11. The camera of claim 9 wherein the object-of-interest is a full body of a person or a head of the person.

12. The camera of claim 9 wherein the object-of-interest is a full body of a person.

13. The camera of claim 9 wherein quantifying the change in the appearance of the object-of-interest includes measuring a similarity of two isometric projections, onto a feature space, of two respective object chips from two different video frames of the plurality of video frames.

14. The camera of claim 13 wherein a temporal spacing between a first video frame of the two different video frames and a second video frame of the two different video frames is greater than a single video frame.

15. The camera of claim 9 wherein the camera is further configured to transmit the new object profile after the tracking is over.

16. The camera of claim 9 wherein the camera is further configured to transmit the new object profile before the tracking is over.

17. A surveillance network comprising:
a camera configured to:
capture video image frames that correspond to a defined field of view of the camera and include a moving object-of-interest;
track the object-of-interest at least substantially over a period of time starting when the object-of-interest enters the field of view and ending when the object-of-interest exits the field of view;
detect, at a point in time in-between the start and end of the period of time, a threshold exceeding change in an appearance of the object-of-interest; and
create a new object profile for the object-of-interest in response to the detecting of the threshold exceeding change; and
transmit the new object profile after being created; and
a server that includes a database within a server storage, the server being configured to store the new object profile, received from the camera, in the database as a second of at least first and second stored object profiles for the object-of-interest, and
wherein the first object profile relates to the object-of-interest prior to occurrence of the threshold exceeding change.

18. The surveillance network of claim 17 wherein the camera is further configured to transmit the new object profile after the tracking is over.

19. The surveillance network of claim 17 wherein the camera is further configured to transmit the new object profile before the tracking is over.

* * * * *